(12) United States Patent
Kato (10) Patent No.: US 6,997,239 B2
(45) Date of Patent: Feb. 14, 2006

(54) MOTOR-FAN SHROUD WITH RESERVOIR TANK

(75) Inventor: Masahiro Kato, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 11/050,438

(22) Filed: Feb. 4, 2005

(65) Prior Publication Data

US 2005/0180850 A1    Aug. 18, 2005

(30) Foreign Application Priority Data

Feb. 4, 2004 (JP) ............................. 2004-028475

(51) Int. Cl.
F01P 11/00 (2006.01)

(52) U.S. Cl. .................. 165/41; 165/51; 165/121; 165/122; 165/104.32; 123/195 A; 123/41.54; 123/41.55; 123/41.49; 123/41.14; 123/41.43; 123/41.51; 415/220

(58) Field of Classification Search .............. 165/41, 165/51, 121, 122, 104.32; 123/41.49, 41.54, 123/195 A, 41.55, 41.14, 41.43, 41.51; 415/220
See application file for complete search history.

(56) References Cited

U.S. PATENT DOCUMENTS 5,522,457 A * 6/1996 Lenz ........................ 165/121
5,657,817 A * 8/1997 Heine et al. ................ 165/67
6,041,744 A * 3/2000 Oota et al. ............... 123/41.49
2002/0090297 A1 * 7/2002 Kobayashi .................. 415/220
2003/0015152 A1 * 1/2003 Schmitz et al. ........ 123/41.55
2005/0180850 A1 * 8/2005 Kato ......................... 415/220

FOREIGN PATENT DOCUMENTS

| JP | 60119321 A | * | 6/1985 |
| JP | 02181018 A | * | 7/1990 |
| JP | 07243326 A | * | 9/1995 |
| JP | 07259561 A | * | 10/1995 |
| JP | 08014046 A | * | 1/1996 |
| JP | 08072563 A | * | 3/1996 |
| JP | 09088603 A | * | 3/1997 |
| JP | 2003-269169 A | | 9/2003 |

* cited by examiner

Primary Examiner—John K. Ford
(74) Attorney, Agent, or Firm—Foley & Lardner LLP (57) ABSTRACT

A motor-fan shroud is formed at its lower portion with a supporting portion having a hole and at its upper portion with a first and second clip portions arranged apart from each other in a width direction. A reservoir tank is formed at its lower portion with a projection extending downward and insertable into the hole of the supporting portion and at its upper portion with a first and second ear portions insertable from above into the first and second clip portions, respectively. A first clipping surface of the first clip portion has a substantial half-ball shaped projection to be fitted in a hole of the first ear portion, while the second ear portion has a claw to be latched by the second clip portion so that unlatch, in an upward direction, of them can be prevented.

2 Claims, 9 Drawing Sheets

PRIOR ART

FIG. 8

PRIOR ART

FIG. 9

PRIOR ART

MOTOR-FAN SHROUD WITH RESERVOIR TANK

BACKGROUND OF THE INVENTION

1. Field of the Invention

The present invention relates to a motor-fan shroud with a reservoir tank in which a reservoir tank is attached to and supported by a motor-fan shroud for a heat exchanger.

2. Description of the Related Art

Figure 7:
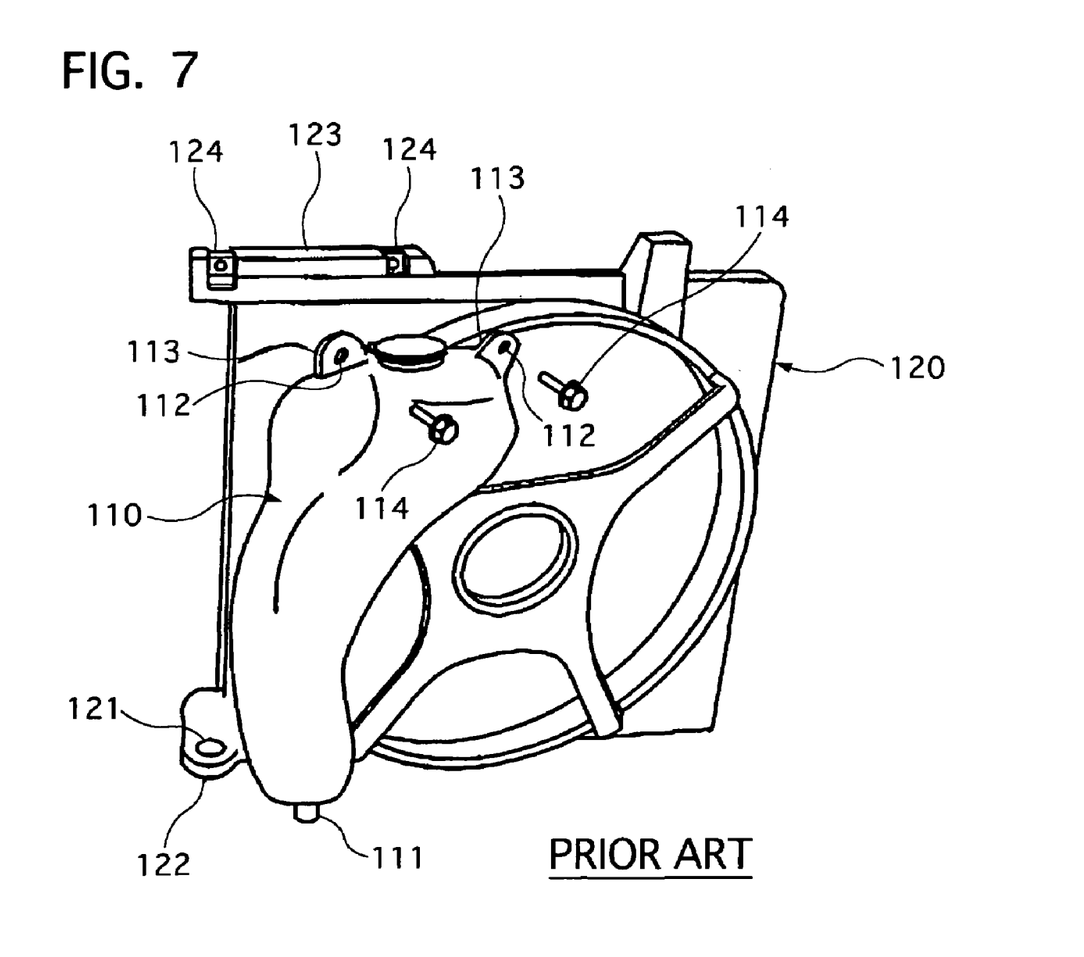
FIG. 7 is a perspective view of a conventional motor-fan shroud with a reservoir tank.

A conventional motor-fan shroud with a reservoir tank of this kind is shown in FIG. 7. A reservoir tank 110 is provided at its lower end portion with a projection 111 extending downward and at its upper portion with two ears 113 and 113 that are spaced in width-direction and have a bolt-hole 112. A motor-fan shroud 120 is formed at its lower portion with a supporting portion 122 having a hole 121 to receive the projection 111 of the reservoir tank 110 and provided at its upper portion with an attachment block 123 that has a thin-walled portion formed with two bolt-holes. The bolt-holes of the attachment block 123 are formed at positions corresponding to the positions of bolt-holes 112 to have a diameter larger than that of the bolt-holes 112 of the reservoir tank 110 and fitted in by J-nuts 124 and 124. The J-nuts 124 ad 124 is made of elastic member, which is bent in the shape of a letter J or U in section so that its one end portion is formed with a screw hole and its other end portion is formed with a hole aligned with the screw hole and having a diameter larger than that of the screw hole. These settings of the larger diameters are for tolerating margins of manufacturing errors.

The above-constructed reservoir tank 110 is attached to the above-constructed motor-fan shroud 120 as follows.

First, the projection 111 of the reservoir tank 110 is inserted in the hole 121 of the motor-fan shroud 120 and supported by its supporting portion 122.

Next, bolts 114 and 114 are engaged with J-nuts 124 and 124 with penetrating the bolt-hole 112 and 1124 of the reservoir tank 110.

This conventional motor-fan shroud with the reservoir tank has disadvantages such that it requires two bolts 114 and 114 and the J-nuts 124 and 124 in addition to work for fitting the J-nuts 124 and 124 into holes of the attachment block 123 and engaging bolts 114 and 114, resulting in increase of a manufacturing process and a manufacturing cost.

Figure 8:
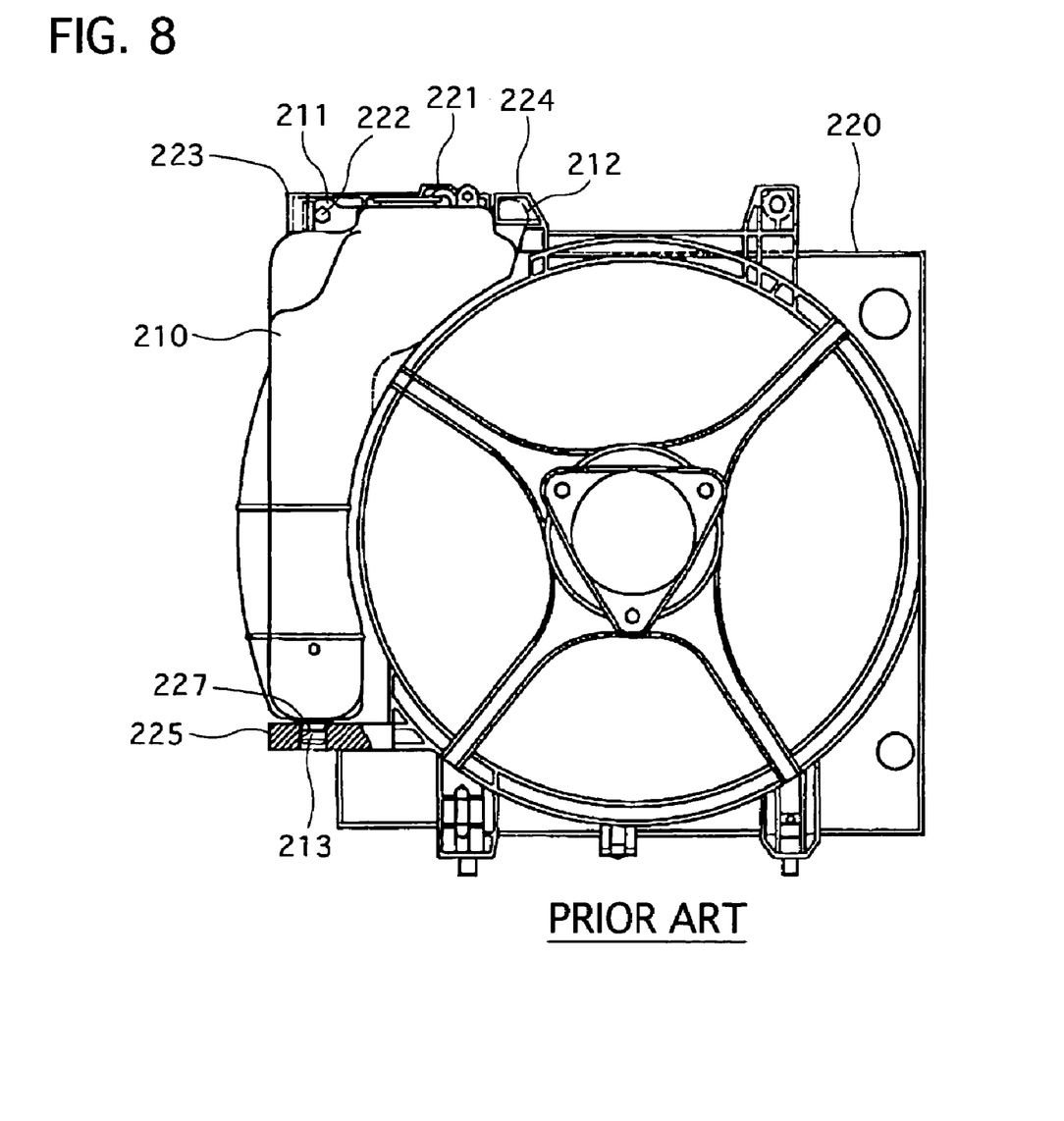
FIG. 8 is a front view of another conventional motor-fan shroud with a reservoir tank.
Figure 9:
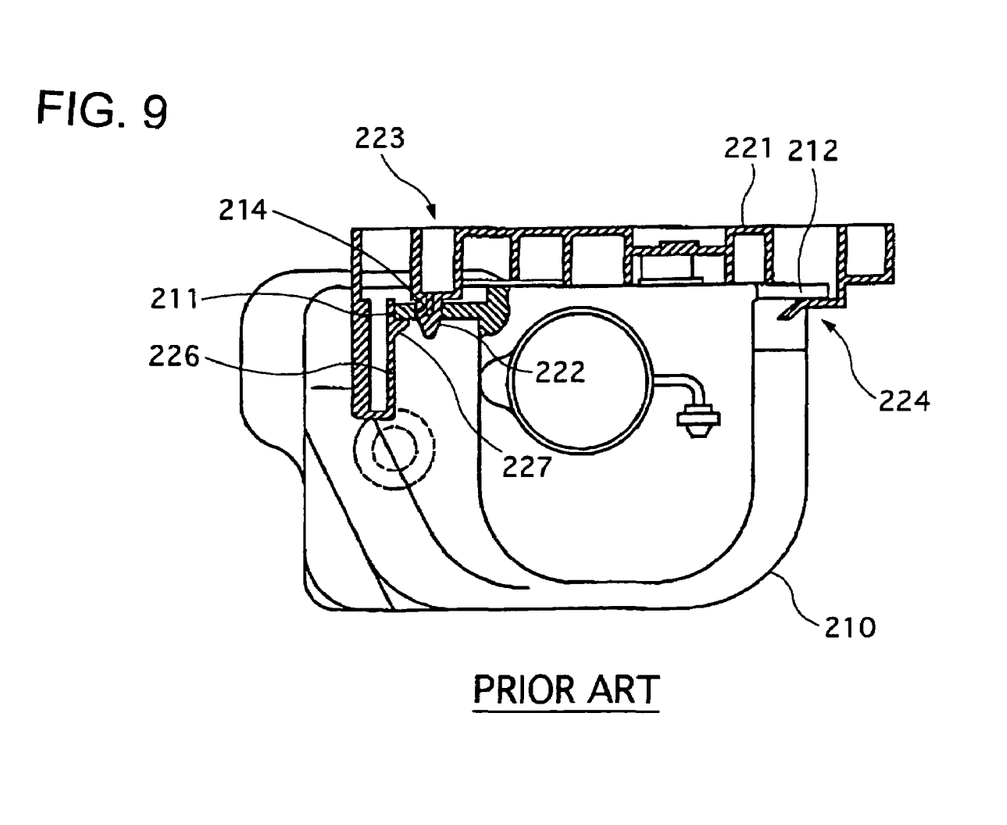
FIG. 9 is an enlarged fragmentary plan view partly in section showing the reservoir tank and an attachment block of the motor-fan shroud, which are shown in FIG. 8.

In order to avoid the above disadvantages, another conventional motor-fan shroud with a reservoir tank, disclosed in Japanese patent laying-open publication No. 2003-269169, is proposed. This motor-fan shroud with the reservoir tank is shown in FIGS. 8 and 9. FIG. 8 is a front view showing the motor-fan shroud 220 with the reservoir tank 210, and FIG. 9 is an enlarged plan view partly in section showing the reservoir tank 210 and an attachment block 221 of the motor-fan shroud 220, which are shown in FIG. 8.

In this conventional motor-fan shroud 220 with the reservoir tank 210, the reservoir tank 210 is provided at its lower portion with a projection 213 extending downward and at its upper portion with a first ear portion 211 with a hole 214 and a second ear portion 212 that are spaced in its width direction. The motor-fan shroud 220 is formed at its lower portion with a supporting portion 225 having a hole 227 to receive the projection 213 of the reservoir tank 210 and provided at its upper portion with the attachment block 221 that has a clip portion 223 with a pin 222 and a hook portion 224. The pin 222 is insertable in the hole 214 of the first ear portion 211 of the reservoir tank 210, while the hook portion 224 is engageable with the second ear portion 212 by sliding and inserting the second ear portion 212 into the hook portion 224. The pin 222 can penetrate the hole 214 of the first ear portion 211 with elastic deformation of the clip portion 226 only when the first ear portion 211 is moved from front side. After the insertion of the pin 222 in the hole 214, a claw portion 227 of the attachment block 221 catches the first ear portion 211, so that the claw portion 227 prevents the disengagement of the first ear portion 211 from the pin 222.

This conventional motor-fan shroud 220 with the reservoir tank 210, however, encounters the following problems. The reservoir tank 210 rattles with respect to the motor-fan shroud 220 because of requirements of predetermined clearance between attaching portions of the shroud 220 and tank 210 for tolerating manufacturing dimension errors due to plastic material. In addition, attachment strength is not large when engaged by using the claw portion 227, the pin 222, and the hook portion 224 formed of plastic material.

It is, therefore, an object of the present invention to provide a motor-fan shroud with a reservoir tank which overcomes the foregoing drawbacks and can prevent a reservoir tank from rattling with respect to a motor-fan shroud and improve attachment strength of them.

SUMMARY OF THE INVENTION

According to a first aspect of the present invention there is provided a motor-fan shroud with a reservoir tank comprising: a motor-fan shroud formed at a lower portion thereof with a supporting portion having a hole and at an upper portion thereof with a first clip portion and a second clip portion that are arranged apart from each other in a width direction; and a reservoir tank formed at a lower portion thereof with a projection extending downward and insertable into the hole of the supporting portion and at an upper portion with a first ear portion insertable from above into the first clip portion and a second ear portion insertable from above into the second clip portion, wherein the first clip portion has a first and second clipping surfaces to sandwich the first ear portion, the first clipping surface being formed with a substantial half-ball shaped projection that projects toward the second clipping surface, and the first ear portion being formed with a hole in which the substantial half-ball shaped projection can fit, and wherein the second clip portion has a first and second clipping surfaces to sandwich the second ear portion, and the second ear portion being provided with a claw to be latched by the second clip portion so that unlatch, in an upward direction, of the second ear portion and the second clip portion can be prevented.

This fit-in of the substantial half-ball shaped projection can locate the reservoir tank with respect to the motor-fan shroud with removing plays between them, especially preventing its saccadic movement in a back and forth direction. The latch of the claw prevents the reservoir tank from unlatch, in an upward direction, of the reservoir tank and motor-fan shroud. The fit-in of the projection into the hole of the supporting portion can support the reservoir tank.

Therefore, the motor-fan shroud with the reservoir tank can prevent the reservoir tank from rattling with respect to the motor-fan shroud and improve attachment strength of them.

Preferably, the motor-fan shroud and the reservoir tank are made of plastic material.

This brings the motor-fan shroud and the reservoir tank to be constructed in a low cost and low weight.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication.

Figure 1:
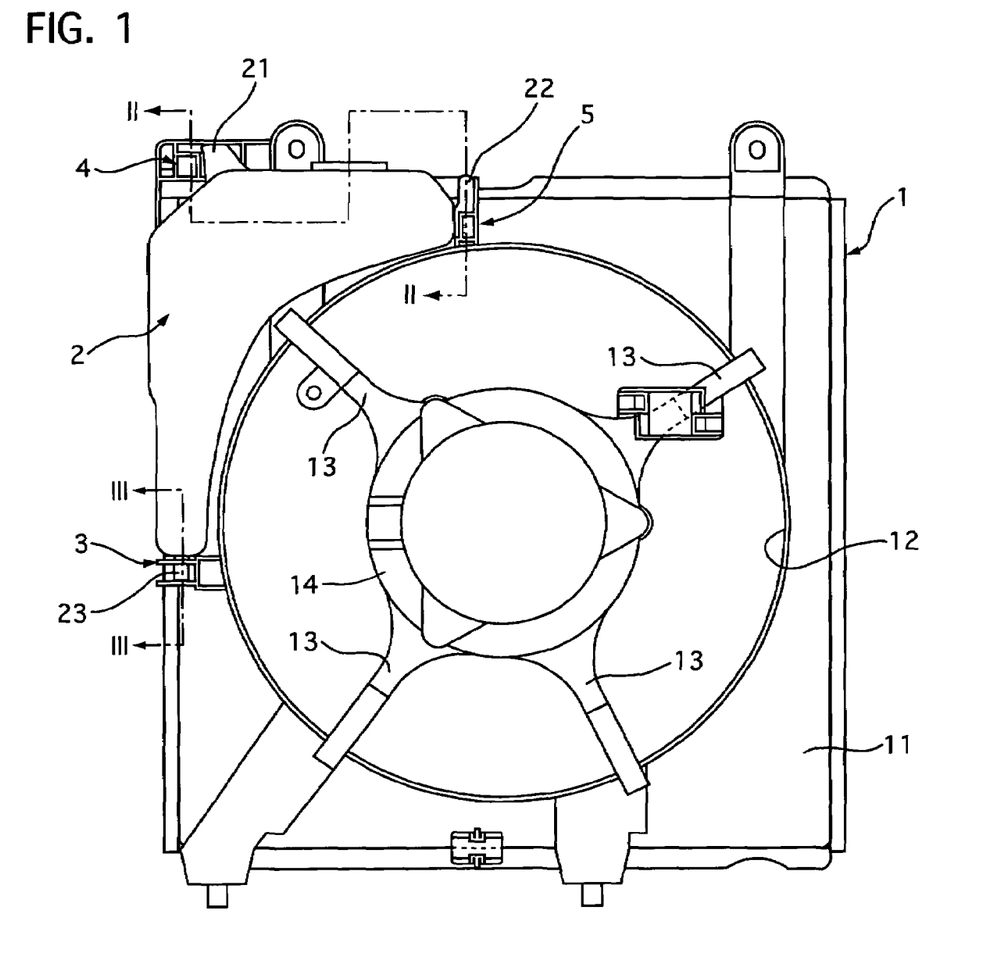
FIG. 1 is a front view showing a motor-fan shroud with a reservoir tank according to a first embodiment of the present invention.

FIG. 1 is a front view showing a motor-fan shroud with a reservoir tank according to a first preferred embodiment of the present invention.

A motor-fan shroud 1 is made of plastic material having predetermined elasticity and has a base portion 11 formed in the shape of a rectangle having a circular hole 12 at its center position. The circular hole 12 is inserted by a not-shown motor-fan which is driven by a not-shown electric motor. The motor is supported by a ring portion 14 connected with inner end portions of four supporting arms 13 that extend from a front side of the base portion 11. The base portion 11, the ring portion 14, and the supporting arms 13 are integrally formed.

The motor-fan shroud 1 is attached to a heat exchanger, such as a radiator of a motor vehicle for cooling coolant, a condenser of a motor vehicle for air-conditioning, or the like.

Figure 5:
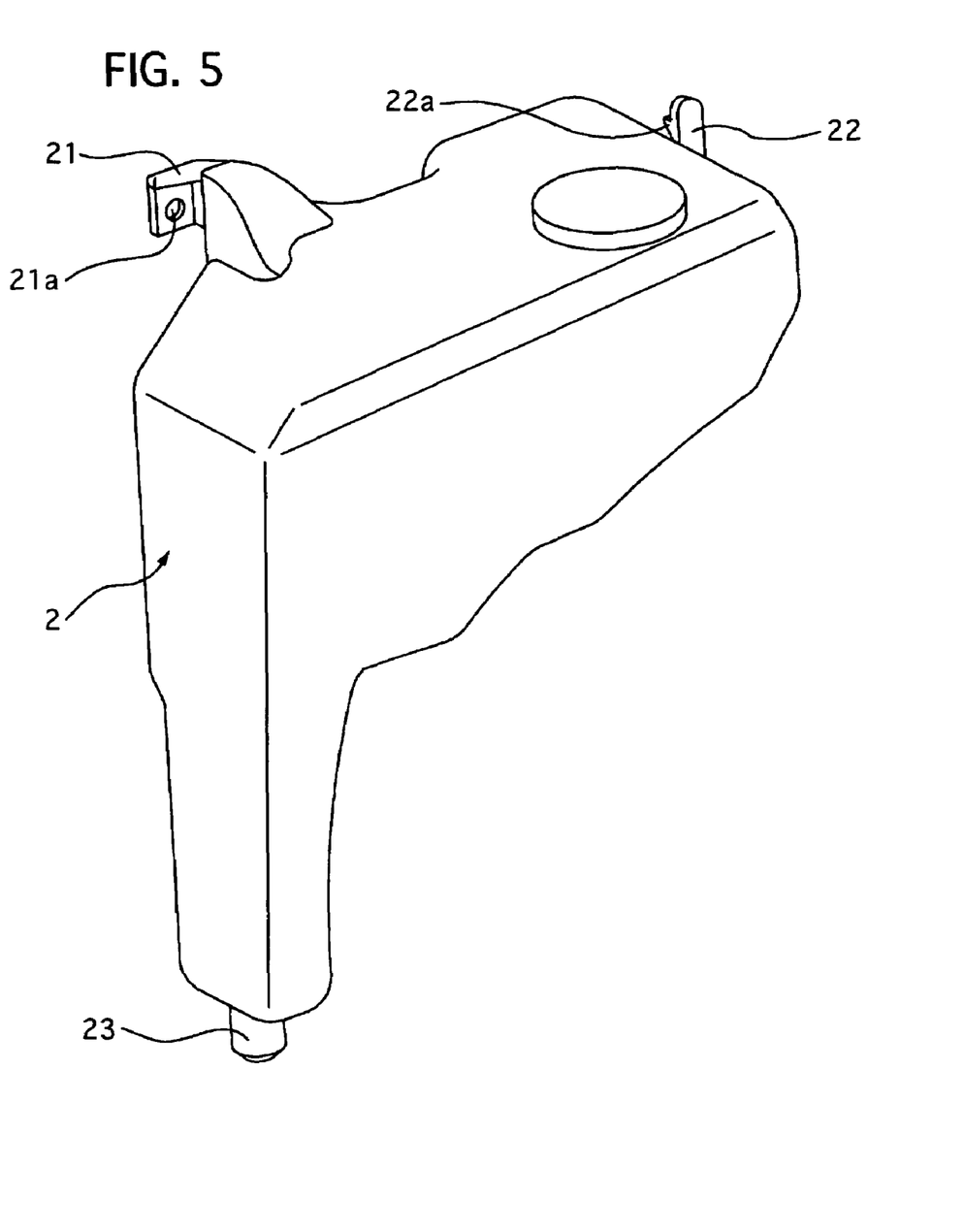
FIG. 5 is an enlarged perspective view showing a font side of the reservoir tank.
Figure 6:
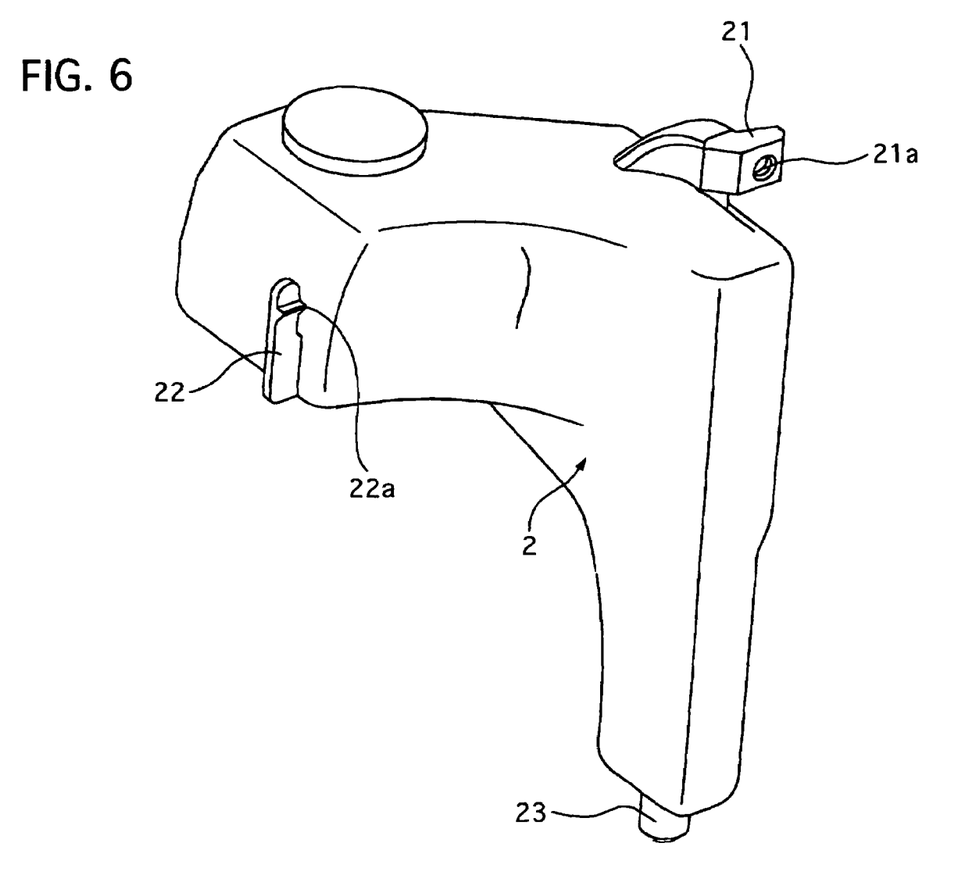
FIG. 6 is an enlarged perspective view showing a rear side of the reservoir tank.

A reservoir tank 2 is attached to and supported by one end side of an upper portion of the shroud 1 so as to store overflowed coolant or the like. The reservoir tank 2 is made of plastic material having predetermined elasticity and formed in the shape of a letter J as shown in FIGS. 1, 5, and 6. The reservoir tank 2 is provided at its upper rear side with a first ear portion 21 and a second ear portion 22 and at its lower portion with a column-shaped projection 23 extending downward. The first and second ear portions 21 and 22 are arranged apart from each other in a width direction. The first ear portion 21 is formed with a hole 21a, and the second ear portion 22 is formed with claw 22a projecting rearward.

Figure 4:
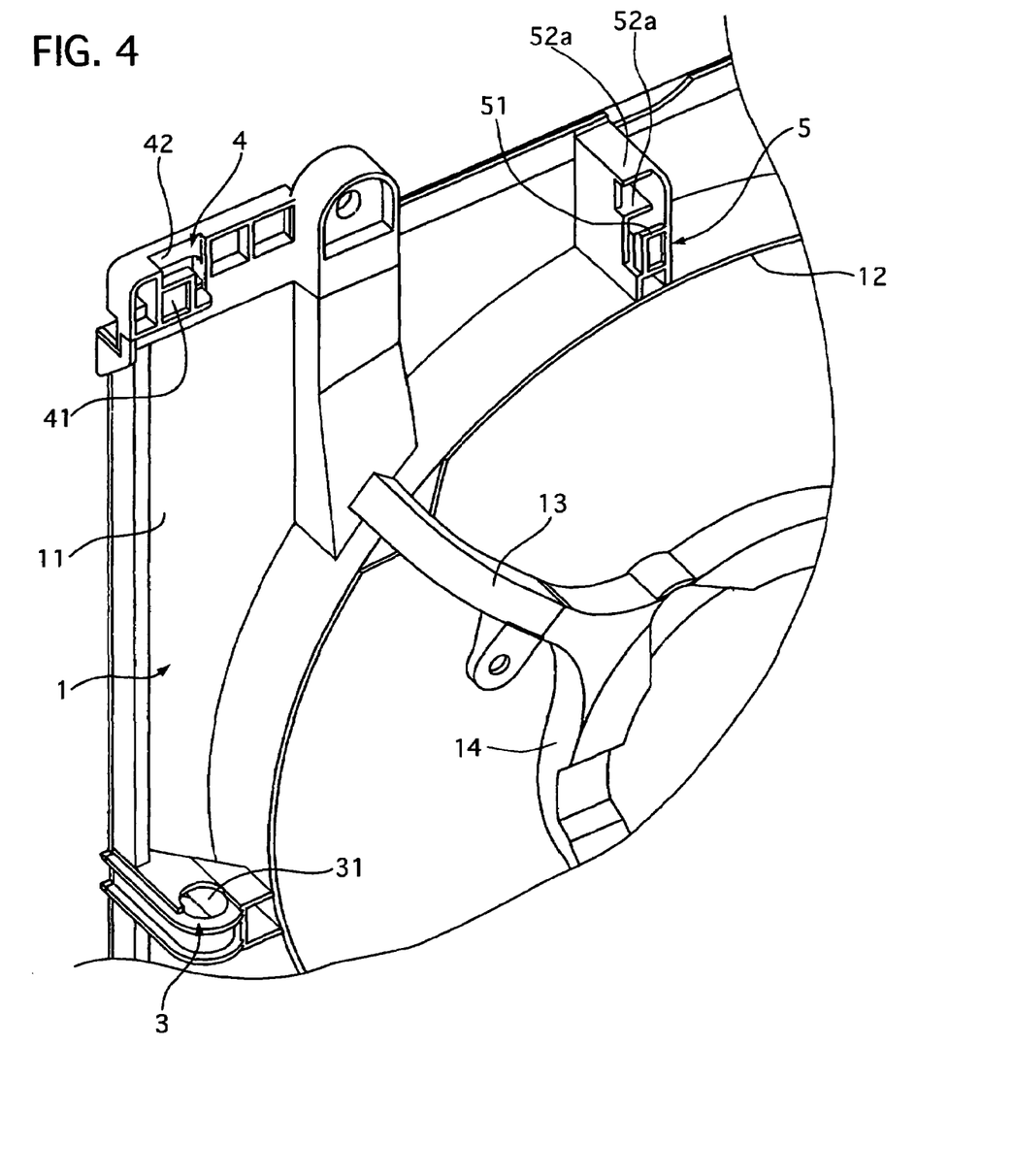
FIG. 4 is an enlarged fragmentary perspective view showing the motor-fan shroud shown in FIG. 1.

As shown in FIG. 4, the motor-fan shroud 1 is formed at a lower front side of the base portion 11 with a supporting portion 3 having a hole 31 to receive the projection 23 of the tank 2 and at a upper front side of the base portion 11 with first and second clip portions 4 and 5 to clip the first ear portion 21 and the second ear portion 22 of the tank 2, respectively.

Figure 2A:
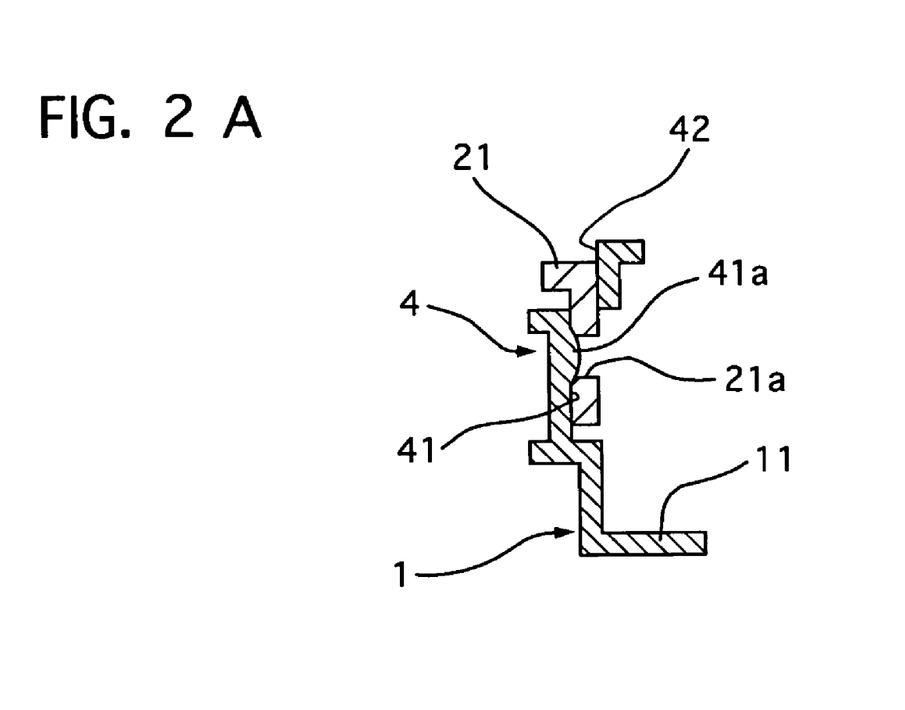
FIG. 2A is an enlarged cross-sectional side view showing a first ear portion of the reservoir tank and a first lip portion of the motor-fan shroud shown in FIG. 1 taken along the line II—II of FIG. 1.
Figure 2B:
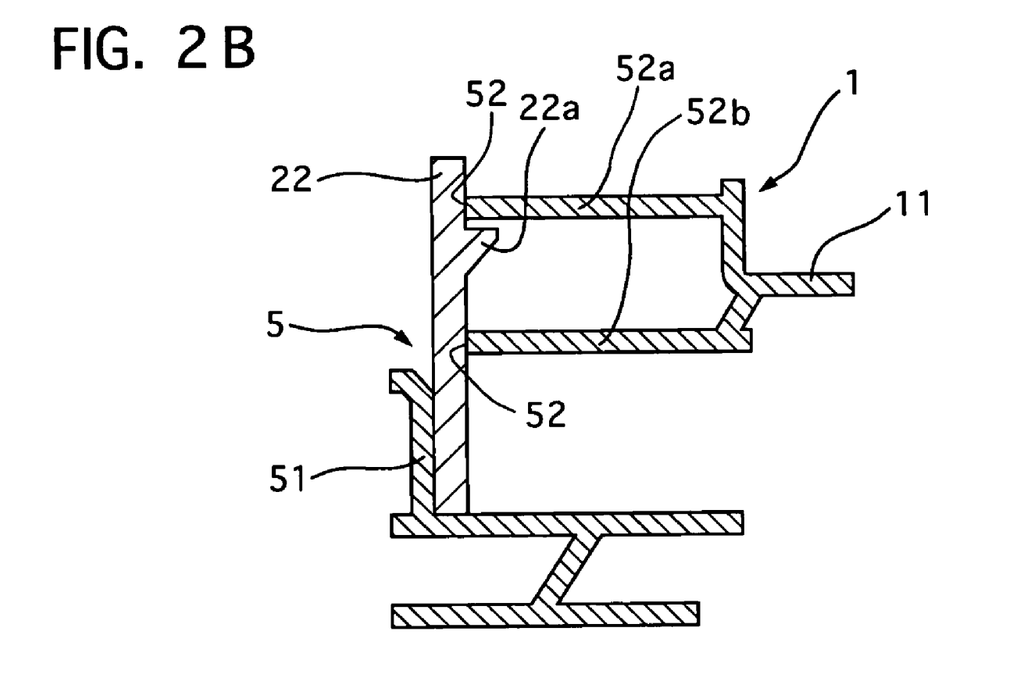
FIG. 2B is an enlarged cross-sectional side view showing a second ear portion of the reservoir tank and a second clip portion of the motor-fan shroud shown in FIG. 1 taken along the line II—II of FIG. 1.
Figure 3:
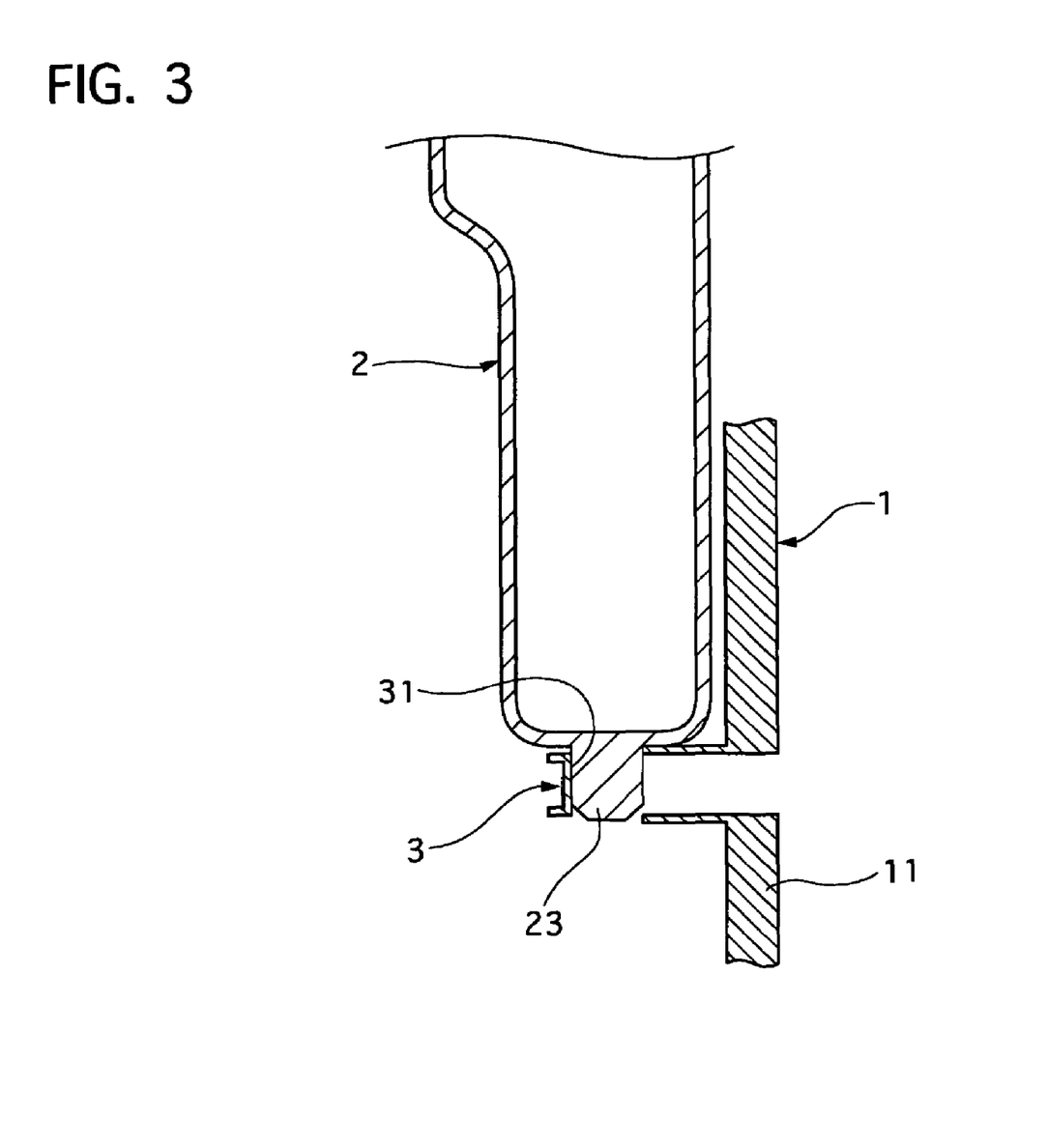
FIG. 3 is an enlarged cross-sectional side view showing a projection of the reservoir tank and a supporting portion of the motor-fan shroud shown in FIG. 1 taken along the line III—III of FIG. 1.

FIG. 2A is an enlarged cross-sectional view showing the first clip portion 4 formed on the base portion 11 of the shroud 1 and the first ear portion 21 of the tank 2 in a state that they are engaged with each other, and FIG. 2B is an enlarged cross-sectional view showing the second clip portion 5 formed on the base portion 11 of the shroud 1 and the second ear portion 22 of the tank 2 in a state that they are engaged with each other.

The clip portions 4 and 5 of the shroud 1 are constructed so that the first and second ear portions 21 and 22 can be inserted in the clip portions 4 and 5 by moving them downward.

As shown in FIGS. 2A and 4, the first clip portion 4 has front and rear clipping surfaces 41 and 42 that are positioned forth and back respectively so as to receive the first ear portion 21 of the tank 2. The front clipping surface 41 is formed with a substantial half-ball shaped projection 41a that projects rearward from the front clipping surface 41 so that a top portion of the projection 41a can be inserted in and fitted to the hole 21a of the first ear portion 21. The projection 41a is pressed against the hole 21a by elastic force of the first clip portion 4 when the first ear portion 21 is inserted in the first clip portion 4. The first clip portion 4 is formed so as to easily be bent and produce the elastic force, and lower portion of the rear clipping surface 42 is cut away so that the first ear portion 21 can be easily bent due to its elasticity for easily receiving the projection 41a in the hole 21a.

As shown in FIGS. 2B and 4, the second clip portion 5 has front and rear clipping surfaces 51 and 52 that are positioned forth and back respectively so as to receive the second ear portion 22 of the tank 2. The rear clipping surfaces 52 are formed on front end portions of upper and lower walls 52a and 52b which are arranged apart from each in a vertical direction and extend in a horizontal direction. Accordingly, the second ear portion 22 of the tank 2 can be inserted between the clipping surfaces 51 and 52 by moving the second ear portion 22 down ward into the second clip portion 5. When the second ear portion 22 is inserted, the second ear portion 22 and the upper wall 52a can be easily bent due to their elasticity, so that the second ear portion 22 can easily inserted in the second clip portion 5. The claw 22a of the second ear portion 22 is formed at lower side in a tapered shape so as to easily be inserted in the second clip portion 22a. When the second ear portion 22 is inserted, the claw 22a rides over the upper wall 52a easily because of its tapered lower side, and then is restrained by the upper wall 52a.

In order to attach the reservoir tank 2 to the motor-fan shroud 1, the tank 2 is moved down toward the shroud 1 in a manner that the first and second ear portions 21 and 22 are inserted from above into the first and second clip portions 41 and 42, respectively, with inserting the projection 23 into the hole 31 of the supporting portion 3.

The first clip portion 21 receives the first ear portion 21, and in this state, further moving the tank 2 downward brings the half-ball shaped projection 41a, applied by elastic force from the first clip portion 21, to be fitted in the hole 21a as shown in FIG. 2A. This fit-in of the half-ball shaped projection 41a can locate the tank 2 with respect to the shroud 1 with removing plays between them, especially preventing its saccadic movement in a back and forth direction.

The second clip portion 22 receives the second ear portion 22, and in this state, further moving the tank 2 downward brings the claw 22a to be latched by the upper wall 52a. This latch of the claw 22a prevents the tank 2 from unlatch, in an upward direction, of the tank 2 and shroud 1.

Since the first clipping surfaces 41 and 51 positioned at the front side are formed without a hole and do not need to be bent so much, they can be easily formed to have high attachment strength. Furthermore, since the projection 41a is formed on the first clipping surface 41, it increase the attachment strength.

As mentioned above, the motor-fan shroud 1 with the reservoir tank 2 of the embodiment can prevent the reservoir tank 2 from rattling with respect to the motor-fan shroud 2 and improve attachment strength of them.

While there have been particularly shown and described with reference to preferred embodiments thereof, it will be understood that various modifications may be made therein, and it is intended to cover in the appended claims all such modifications as fall within the true spirit and scope of the invention.

The entire contents of Japanese Patent Application No. 2004-028475 filed Feb. 4, 2004 is incorporated herein by reference.

What is claimed is:

1. A motor-fan shroud with a reservoir tank comprising:
a motor-fan shroud formed at a lower portion thereof with a supporting portion having a hole and at an upper portion thereof with a first clip portion and a second clip portion that are arranged apart from each other in a width direction; and
a reservoir tank formed at a lower portion thereof with a projection extending downward and insertable into the hole of the supporting portion and at an upper portion with a first ear portion insertable from above into the first clip portion and a second ear portion insertable from above into the second clip portion, wherein
the first clip portion has a first and second clipping surfaces to sandwich the first ear portion, the first clipping surface being formed with a substantial half-ball shaped projection that projects toward the second clipping surface, and the first ear portion being formed with a hole in which the substantial half-ball shaped projection can fit, and wherein
the second clip portion has a first and second clipping surfaces to sandwich the second ear portion, and the second ear portion being provided with a claw to be latched by the second clip portion so that unlatch, in an upward direction, of the second ear portion and the second clip portion can be prevented.

2. A motor-fan shroud with a reservoir tank according to claim 1, wherein
the motor-fan shroud and the reservoir tank are made of plastic material.

* * * * *